(No Model.)
D. L. BALLARD.
REVERSING GEAR FOR SHAPING MACHINES.
No. 310,774. Patented Jan. 13, 1885.
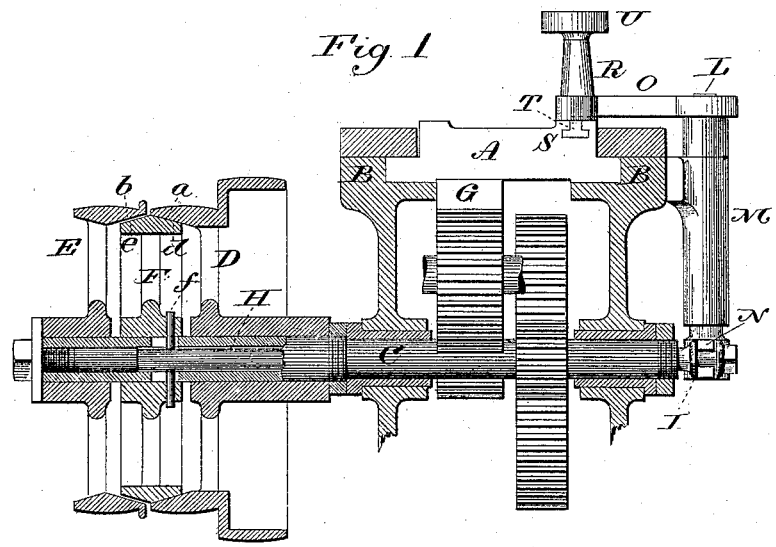
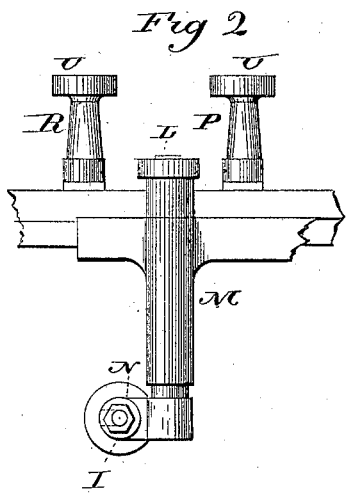
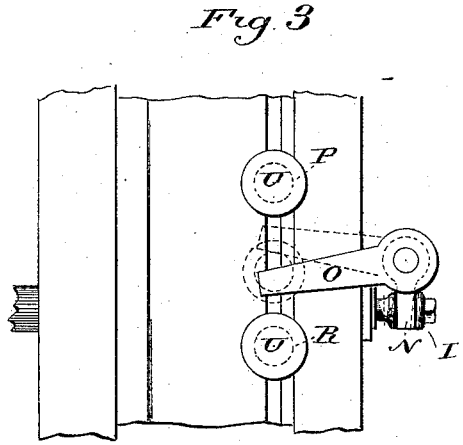
Witnesses.
David L. Ballard
Inventor
By Atty

UNITED STATES PATENT OFFICE.

DAVID L. BALLARD, OF TORRINGTON, CONNECTICUT, ASSIGNOR TO THE HENDEY MACHINE COMPANY, OF SAME PLACE.

REVERSING-GEAR FOR SHAPING-MACHINES.

SPECIFICATION forming part of Letters Patent No. 310,774, dated January 13, 1885.

Application filed May 12, 1884. (No model.)

*To all whom it may concern:*

Be it known that I, DAVID L. BALLARD, of Torrington, in the county of Litchfield and State of Connecticut, have invented a new Improvement in Reversing-Gear for Shaping-Machines; and I do hereby declare the following, when taken in connection with accompanying drawings and the letters of reference marked thereon, to be a full, clear, and exact description of the same, and which said drawings constitute part of this specification, and represent, in—

Figure 1, a transverse sectional view; Fig. 2, partial side view opposite the pulleys; Fig. 3, top or plan view, these several figures showing so much of a shaping-machine as necessary for the illustration of my invention.

This invention relates to a device for reversing the action of the power upon the tool-carrier in a shaping-machine, whereby the reciprocating movement may be imparted to said tool, and is an improvement upon the invention for which Letters Patent were granted to E. J. Manville, January 20, 1874, No. 146,539, and whereby that invention, applicable to metal planers, is adapted to shaping-machines; and the invention consists in the construction as hereinafter described, and more particularly recited in the claim.

A represents the slide which carries the tool in a common shaping-machine. It is arranged in the usual manner in the bed between guides B B. Transversely across the bed, beneath the slide and in suitable bearings, the driving-shaft C is arranged. This shaft I make tubular and on one side of the bed to extend outward, and upon its projecting end the two pulleys D E are arranged, both loose. Upon these pulleys the usual two belts are applied, the one to drive, say, the pulley D in the working direction, and the other to drive the pulley E in the reverse direction. The inner surfaces of the two pulleys from their meeting edges gradually contract in diameter, so as to produce an inclined internal face, *a*, upon the pulley D, and a like inclined internal face, *b*, on the pulley E. Between the two pulleys the friction-clutch F is arranged. This clutch has its periphery inclined corresponding to the inclines of each of the pulleys D E, and so that when moved to bring its one inclined face *d* into firm contact with the inclined face *a* of the pulley D, the friction between the two is so great that rotation imparted to the pulley D will communicate that rotation to the clutch F, and when so joined the other inclined face *e* of the clutch is free from the corresponding inclined face *b* of the other pulley E, as seen in Fig. 1. The clutch F is free to slide longitudinally on the shaft between the two pulleys, but is connected with the shaft so as to revolve with it. This may be done by a spline, in the usual manner for pulleys sliding upon the shaft, or it may be by a pin, *f*, through the hub of the clutch and through a longitudinal slot in the shaft. The tubular shaft C extends through to the opposite side of the frame, and carries the usual gears to make connection with the slide A through a rack, G, whereby the rotation of the shaft will impart a corresponding horizontal movement to the slide.

Longitudinally through the shaft C a spindle, H, is arranged. This spindle extends to a point within the hub of the clutch F, and the pin *f* passes through the said spindle, as shown, so that a longitudinal movement imparted to the spindle will impart to the clutch a corresponding movement toward one pulley and from the other. This spindle extends through the shaft at the opposite end, where it is provided with an annular grooved collar, I. Near this collar is a vertical rock-shaft, L, arranged in a suitable bearing, M. On the lower end of this shaft is a fork, N, extending into the annular groove of the collar I, as seen in Figs. 2 and 3. At the upper end of this rock-shaft L a lever, O, extends over the slide and so as to stand in the path of studs P R, as seen in Figs. 1 and 3. The studs P R are arranged one each side of the end of the lever O, and are adjustable in a T-shaped groove, S, in the slide A in the usual manner—that is to say, a T-shaped bolt, T, stands in the groove S and extends up through the stud. Above the stud is a nut, U, which screws onto the bolt and so as to clamp the stud upon the slide at any point where it may be adjusted. The two studs are adjusted so that as the slide moves forward the rear stud, R, will strike the lever O as the slide approaches its extreme forward movement, and, finishing such forward movement, will turn the lever O, as indicated in broken lines, Fig. 3, and the turning of the lever O will correspondingly turn the fork N through the shaft L and force the spindle toward the opposite side, and cause the clutch F to pass into the other pulley E and make engagement with its face, and that pulley revolving in the opposite direction to the pulley D which gave the forward movement to the slide, will impart to the shaft a corresponding reverse movement, causing the slide A to return until the stud P strikes the lever O in completing such rear movement and returns the fork, which will return the spindle and bring the clutch F into engagement with the pulley D, as before, and as seen in Fig. 1.

The arrangement of the two pulleys, the friction-clutch between them, and the spindle within the shaft on which the pulleys run is substantially the same as in the patent of Manville, before referred to. I therefore do not claim, broadly, such an arrangement of the friction-clutch and pulleys; but What I do claim is—

In a shaping-machine, the combination of the tool-carrying slide A, the horizontal tubular shaft C in gear-connection with said slide, loose pulleys D E, arranged upon the shaft at one side of the bed, the friction-clutch F on the shaft between said pulleys, the face of the clutch and the inner faces of the pulleys correspondingly inclined for frictional engagement, the spindle H within said tubular shaft, in connection at one end with the clutch F, the other end extending through the shaft and fitted with an annular grooved collar, I, a vertical rock-shaft, M, carrying at its lower end a fork, N, in connection with the said grooved collar, the lever O on the upper end of the rock-shaft, and adjustable stops P R on the slide, substantially as and for the purpose described.

DAVID L. BALLARD.

Witnesses:
CHAS. L. MCNEIL,
HENRY J. HENDEY.